United States Patent Office 3,052,730
Patented Sept. 4, 1962

3,052,730
PROCESS FOR MAKING CITRONELLOL AND INTERMEDIATE THEREFOR AND NOVEL INTERMEDIATES MADE THEREBY
Habib Emile Eschinazi, Montclair, N.J., now by change of name Emile Haviv Eschinasi, assignor to The Givaudan Corporation, New York, N.Y., a corporation of New Jersey
No Drawing. Filed Mar. 3, 1959, Ser. No. 796,767
11 Claims. (Cl. 260—631.5)

The present invention relates to an improved process for making citronellol and an intermediate therefor, as well as the novel intermediate.

Citronellol is a material widely used in perfumery. It is obtained in essential oils such as rose, citronella, savin, palmarosa, Spanish verbena, geranium, and in oakmoss. All of these materials are of foreign origin, and are subject to wide fluctuations in price and availability.

In accordance with the present invention, an improved process for making citronellol from relatively inexpensive, domestically-available terpenic raw materials, is provided.

The starting material used in the present process is represented by the following formula:

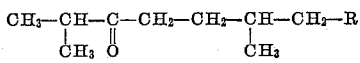

where R is a member selected from the group consisting of CHO, COO alkyl and COOH. In general, the process involves hydrogenating the indicated starting material, in the presence of a hydrogenating catalyst at an elevated temperature, so as to form 3,7-dimethyl-1,6-octanediol; and then dehydrating the latter diol in the presence of a dehydrating agent at an elevated temperature, so as to form citronellol.

The starting material in the present process is obtained in known manner form 3-p-menthene, which may be represented structurally as follows:

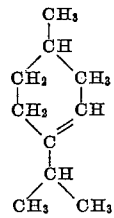

This material may be used either in its optically-active or inactive forms. It may be obtained in many ways, including the semi-hydrogenation of terpenic substances such as dipentene or d-limonene, followed by rearrangement of the isomeric menthene by means of acid-base catalysis, in known manner. The desired 3-p-menthene may also be obtained in known manner from menthol or 8-p-menthanol, by dehydration.

Various known methods may be employed to obtain the starting material of the present process from 3-p-menthene. Such processes include oxidation with ozone, whereby a mixture of 3,7-dimethyl-6-oxooctanal and 3,7-dimethyl-6-oxooctanoic acid, the former predominating, is obtained. If desired, 3-p-menthane derivatives, such as menthols and menthanes, may be oxidized in known manner with potassium bichromate to yield 3,7-dimethyl-6-oxooctanoic acid, also known as ketomenthylic acid.

Specific examples of individual starting materials include 3,7-dimethyl-6-oxooctanal; 3,7-dimethyl-6-oxooctanoic acid; and butyl-3,7-dimethyl-6-oxooctanoate.

In hydrogenating the starting material of this process, hydrogenating catalysts that can convert the carbonyl, carboxy and carbalkoxy groups to the alcohol may be used. We prefer, however, for economic reasons to use either Raney nickel or copper chromite catalysts for this purpose.

Also, chemical reducing agents such as metallic sodium may successfully be used to reduce these groups and in particular the carbalkoxy groups.

The temperatures at which the starting material may be hydrogenated may be varied widely. Temperatures within the range from about 0° C. to about 250° C. and pressures between 15 to 5000 p.s.i. give satisfactory results. Especially desirable results are obtained when temperatures within the range from about 40° C. to 120° C. and 100 to 300 p.s.i. with Raney nickel and about 180° C. to 220° C. and 1500 to 3000 p.s.i. with copper chromite catalyst and 50° C. to 100° C. for the liquid phase reduction with metallic sodium.

The 3,7-dimethyl-1,6-octanediol formed in the process of this invention is a novel material. It has the following physical constants in substantially pure condition:

B.P.←120–125° at 2.5 mm., $n_D^{20}$←1.4625

In addition to its use to prepare citronellol in accordance with this process, my novel 3,7-dimethyl-1,6-octanediol is useful as a fixative and an antioxidant of odors and aromatic substances having for example labile carboxylic groups.

In dehydrating the novel 3,7-dimethyl-1,6-octanediol of this invention, acid dehydrating catalysts such as phosphoric and sulfuric acids are used. Also acid salts such as sodium or potassium bisulfates could efficiently be used to achieve dehydration. Catalytic dehydration by means of substances such as alumina can also be used. The temperature at which the dehydration of the diol could be usefully performed may vary according to the type of the catalyst, its acidity as well as its dehydrating power, it may range from as low as 0° C. for concentrated sulfuric acid and as high as 300° C. with alumina, but the preferred range is about 140–200° C. for $KHSO_4$ and about 250–280° C. for alumina.

In order more clearly to illustrate this invention, the following examples, in which degrees are centigrade and all parts are by weight unless otherwise specifically stated, are given.

EXAMPLE I

*Preparation of 3,7-Dimethyl-6-Oxoctanal and 3,7-Dimethyl-6-Oxooctanoic Acid*

200 ml. of 3-p-menthene and 200 ml. acetic acid are mixed in a reaction flask with a stream of about 2% ozone containing oxygen, i.e., 2000 parts of ozone per 1,000,000 parts of oxygen, at a rate of about 100 l. gas per hour while the temperature of the reaction mixture is being maintained around 10–15° by external cooling. The ozonization is complete in about 10 hours when the ozone starts "bleeding out" (a potassium iodide solution will liberate iodine if the spent gas contains unreacted ozone). By the term "bleeding out" is meant the discharge of unreacted ozone with the stream of oxygen.

The viscous solution of the ozonide is then carefully added within 1 hour into a vigorously agitated suspension of 80 g. powdered zinc in 350 ml. of water. Cooling is required to maintain the reaction temperature around 40° C. Stirring is maintained for an additional hour and the oil is separated from the top. The bottom layer is then extracted twice with 250 ml. benzene and then discarded. The benzene solution and the oil are mixed together and then washed with 10% soda ash solution until alkaline. The bottom alkaline layer is separated and kept aside while the top benzene layer is evaporated and then distilled at 3 mm. pressure. The 3,7-dimethyl-6-oxooctanal distills at 90–93° C. and weighs 150–160 g.; $n_D^{20}$=1.4450. It shows a purity of over 90% by oximation.

The alkaline, bottom layer upon acidification with strong hydrochloric acid and extraction with 50 ml. benzene afforded 10–15 g. of 3,7-dimethyl-6-oxooctanoic acid, B.P. at 3 mm. 134–136°; $n_D^{20}$=1.4494.

EXAMPLE II

*Preparation of 3,7-Dimethyl-1,6-Octanediol*

200 g. of 3,7-dimethyl-6-oxooctanal, obtained in accordance with Example I, and 15 g. Raney nickel are placed in a 1.5 l. rocking autoclave. The vessel is evacuated to remove the air present and hydrogen is then fed at a pressure of 300 p.s.i. The autoclave is agitated and heating is begun. The absorption of hydrogen which starts around 40° increases as the temperature is brought to 120°. The hydrogen absorption ceases after the equivalent of two moles of hydrogen is absorbed. The autoclave is then cooled and the reaction mixture decanted from the catalyst. The yield is almost quantitative and the diol when distilled at 2.5 mm. boils at 120–125° C., $n_D^{20}$=1.4625. The crude diol can be used as is for the preparation of citronellol.

EXAMPLE III

*Preparation of Citronellol*

67 g. of 3,7-dimethyl-1,6-octanediol, obtained in accordance with Example II, were fed within 3½ hours over a 3 ft. Pyrex (½ inch diameter) column filled with $Al_2O_3$ (Alcoa F 20) and kept at 275°. There were collected a total of 51.5 g. of oil and approximately 4 ml. of water. The oil was dried with soda ash and distilled to give the following cuts:

(1) B.P. at 4 mm. 60–82°=8 g. light cut containing 30% diene hydrocarbons and 70% citronellol
(2) B.P. at 4 mm. 82–90°=23 g. citronellol $$n_D^{20}=1.4510-1.4525$$

containing 93% citronellol
(3) B.P. at 4 mm. 90–120°=11.5 g. diol containing ca. 75%, 25% citronellol.

The citronellol was identified by means of its characteristic rose odor and also by means of its infrared spectrum which was identical with that of a citronellol obtained from natural sources.

EXAMPLE IV

*Preparation of Citronellol*

30 g. of 3,7-dimethyl-1,6-octanediol, obtained in accordance with Example II, 30 ml. toluene and 1 g. 70% perchloric acid are heated under relux for 3 hours with a Dean-Stark trap for collecting the water of reaction. 3.1 ml. of water were thus collected. The toluene solution was then neutralized with 10% caustic soda solution and evaporated. Upon distillation the following cuts were obtained:

(1) B.P. at 3 mm. up to 62°=4.5 g. lights mostly hydrocarbons
(2) B.P. at 3 mm. 86–90°=15.5 g. Citronellol cut, $n_D$=1.4520 very fragrant
(3) B.P. at 3 mm. 189–190°=6.5 g. mostly dimeric hydrocarbons.

EXAMPLE V

*Preparation of 3,7-Dimethyl-1,6-Octanediol*

126 g. of butyl 3,7-dimethyl-6-oxooctanoate (obtained by means of known esterification procedure of 3,7-dimethyl-6-oxooctanoic acid with butanol), B.P. at 3 mm. 122–130°, $n_D^{20}$ 1.4392, are placed in a rocking autoclave of 1½ lit. capacity together with 13 g. of copper chromite catalyst. After evacuation of the air, the autoclave is filled with hydrogen at 2000 p.s.i. pressure and the hydrogenation carried out at 220°. After about 15 hours an equivalent of about 1.6 moles of hydrogen were absorbed.

The reaction vessel was left to cool and the reaction mixture was filtered and distilled. There was recovered:

65 g. B.P. at 3 mm. 122–124°, $n_D^{20}$ 1.4600–1.4620, corresponding to the desired glycol.

EXAMPLE VI

*Preparation of Citronellol*

18 g. of the 3,7-dimethyl-1,6-octanediol obtained in accordance with Examples II or V, and 2 g. of $KHSO_4$ were heated to 175–180° under a slight vacuum. The distillate was returned back to the flask and redistilled once more under vacuum at 180–195°. The distillate was then dissolved in 25 ml. of ether, separated from the water, neutralized with soda ash and distilled to yield as the main cut 9 g. B.P. at 3 mm. 75–82° of an oil $n_D^{20}$ 1.4520 with a strong smell of citronellol.

EXAMPLE VII

*Preparation of 3,7-Dimethyl-1,6-Octanediol*

To 20 g. of 3,7-dimethyl-6-oxooctanoic acid, obtained in accordance with Example I, in 40 ml. of dry ether were added within 15 minutes under stirring 8 g. of lithium aluminum hydride dissolved in 125 ml. of dry ether. The reaction mixture was then heated and stirred under reflux for 1 hour. It was then decomposed with 20 ml. of water, then acidified with 10% sulfuric acid and extracted three times with 100 ml. ether. The ether layer was separated and neutralized with soda ash and evaporated. Upon distillation there were obtained:

18 g. B.P. at 3 mm. 130–135°, $n_D^{20}$ 1.4613 corresponding to the desired diol.

EXAMPLE VIII

*Preparation 3,7-Dimethyl-1,6-Octanediol*

To 40 g. of butyl 3,7-dimethyl-6-oxooctanoate in 340 ml. butanol were added within 10–20 minutes at a temperate of 90°, 26 g. of metallic sodium in small slices. The reaction mixture was then heated under reflux for 2–3 hours then left overnight. After decomposition with 100 ml. of water, the bottom layer was separated and extracted twice with 25 ml. of benzene. The benzene layers were then added to the first top layer, washed with 10% sulfuric acid, neutralized with soda ash and distilled. There was obtained some unreacted material followed by 9 g., B.P. at 3 mm. 125–130°, $n_D^{20}$ 1.4600 corresponding to the desired 3,7-dimethyl-1,6-octanediol.

EXAMPLE IX

*Preparation of 3,7-Dimethyl-6-Oxooctanal*

To a stirred mixture of 72 g. of lead tetraacetate in 150 ml. dry benzene were added within 15–20 minutes, 40 g. of crystalline trans 3,4-p-menthanediol (obtained by known methods through the hydroxylation of 3-p-menthene with hydrogen peroxide-formic acid mixture) while the temperature is being mainatined around 35–40°. Then the temperature was raised to 50° for an additional 10 minutes. The recation mixture was then decomposed with 150 ml. of water and the top layer separated and neutralized with soda ash. Upon distillation 36 g. of 3,7-dimethyl-6-oxooctanal, B.P. at 3 mm. 90–93°, $n_D^{20}$ 1.4450, is obtained as the major cut.

The foregoing illustrates the practice of this invention, which, however, is not to be limited thereby but is to be construted as broadly as permissible in view of the pior art and limited solely by the appended claims.

I claim:

1. The process for making citronellol, which comprises reacting a material having the formula:

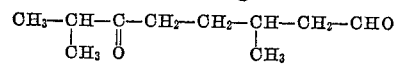

with hydrogen in the presence of a hydrogenating catalyst at a temperature within the range from about 0° C. to about 250° C., and reacting the thus-formed 3,7-dimethyl-1,6-octanediol in the presence of a dehydrating agent at a temperature within the range from about 0° C. to about 300° C.

2. The process for making citronellol, which comprises reacting 3,7-dimethyl-6-oxooctanal with hydrogen in the presence of Raney nickel at a temperature within the range from about 40° C. to about 120° C., under a pressure of about 300 pounds per square inch, and then dehydrating the resulting 3,7-dimethyl-1,6-octanediol in the presence of aluminum oxide at around 275° C.

3. The process for making 3,7-dimethyl-1,6-octanediol, which comprises reacting a material having the formula:

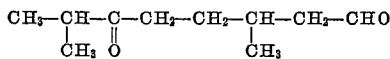

with hydrogen in the presence of a hydrogenating catalyst at a temperature within the range from about 0° C. to about 250° C.

4. The process for making 3,7-dimethyl-1,6-octanediol, which comprises reacting 3,7-dimethyl-6-oxooctanal with hydrogen in the presence of Raney nickel at a temperature within the range from about 40° C. to about 120° C., under a pressure of about 300 pounds per square inch.

5. The process for making citronellol, which comprises reacting 3,7-dimethyl-1,6-octanediol in the presence of a dehydrating agent at temperature within the range from about 0° C. to about 300° C.

6. The process of claim 5, wherein the dehydrating agent is aluminum oxide.

7. The process of claim 5, wherein the dehydrating agent is perchloric acid.

8. The process of claim 5, wherein the dehydrating agent is potassium hydrogen sulfate.

9. The process for making citronellol, which comprises reacting 3.7-dimethyl-1,6-octanediol in the presence of aluminum oxide at around 275° C.

10. The process for making citronellol, which comprises refluxing 3,7-dimethyl-1,6-octanediol in the presence of perchloric acid and toluene.

11. The process for making citronellol, which comprises recating 3,7-dimethyl-1,6-octanediol in the presence of potassium acid sulfate at a temperature within the range from about 175° C. to about 195° C.

References Cited in the file of this patent

UNITED STATES PATENTS

| | | |
|---|---|---|
| 2,094,611 | Lazier | Oct. 5, 1937 |
| 2,809,186 | Smith et al. | Oct. 8, 1957 |
| 2,902,495 | Webb | Sept. 1, 1959 |

FOREIGN PATENTS

| | | |
|---|---|---|
| 1,152,562 | France | Sept. 9, 1957 |

OTHER REFERENCES

Adkins et al.: J. Am. Chem. Soc., vol. 70, pp. 3121–25 (1948).

Desalbres et al.: Bull. Soc. Chem. France, vol. 23, pp. 761–4 (1956).

Simonsen: The Terpenes (2nd ed.), vol. I, page 37 (1953).

Groggins: Unit Processes in Organic Synthesis (5th ed.), pp. 579–582 (1958).

UNITED STATES PATENT OFFICE
CERTIFICATE OF CORRECTION

Patent No. 3,052,730 — September 4, 1962

Habib Emile Eschinazi

It is hereby certified that error appears in the above numbered patent requiring correction and that the said Letters Patent should read as corrected below.

Column 1, lines 40 to 49, the structural formula should appear as shown below instead of as in the patent:

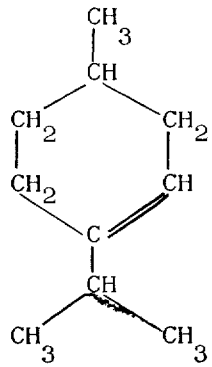

column 2, line 21, strike out the "arrow", second occurrence; line 45, for "Oxoctanal", in italics, read -- Oxooctanal --; in italics; column 3, line 40, after "75%" insert -- diol --; line 51, for "relux" read -- reflux --; line 60, for "$n_D=1.4520$" read -- $n_D^{20}=1.4520$ --; column 4, line 59, for "recation" read -- reaction --; column 6, line 4, for "3.7-dimethyl" read -- 3,7-dimethyl --.

Signed and sealed this 1st day of January 1963.

(SEAL)

Attest:

ERNEST W. SWIDER
Attesting Officer

DAVID L. LADD
Commissioner of Patents